United States Patent [19]
de Lathouder

[11] Patent Number: 4,699,772
[45] Date of Patent: Oct. 13, 1987

[54] PROCESS FOR PREPARING AMMONIA
[75] Inventor: Hans C. de Lathouder, Geleen, Netherlands
[73] Assignee: Stamicarbon B.V., Geleen, Netherlands
[21] Appl. No.: 845,132
[22] PCT Filed: Jun. 27, 1985
[86] PCT No.: PCT/NL85/00025
  § 371 Date: Jan. 31, 1986
  § 102(e) Date: Jan. 31, 1986
[87] PCT Pub. No.: WO86/00286
  PCT Pub. Date: Jan. 16, 1986
[30] Foreign Application Priority Data
  Jun. 30, 1984 [NL] Netherlands ............... 8402090
  Jun. 30, 1984 [NL] Netherlands ............... 8402091
[51] Int. Cl.⁴ .................................... C01C 1/04
[52] U.S. Cl. ............................ 423/359; 252/376
[58] Field of Search ................ 423/359; 252/376
[56] References Cited
  U.S. PATENT DOCUMENTS
  4,296,085 10/1981 Banquy .................. 252/376
  4,383,982 5/1983 Pinto .................... 423/359
  4,409,196 10/1983 Skinner et al. .......... 423/359
  4,524,056 6/1985 Banquy .................. 423/359

OTHER PUBLICATIONS

P. H. Brook: Ammonia Plant Revamping, Proceedings of the Fertilizer International Conference, 1983, pp. 159–175.

Primary Examiner—John Doll
Assistant Examiner—Wayne A. Langel
Attorney, Agent, or Firm—Cushman, Darby & Cushman

[57] ABSTRACT

In a process for preparing ammonia from hydrogen and nitrogen the synthesis gas mixture is produced by partial oxidation, in the presence of a suitable catalyst, at a pressure of from 35 to 150 bar and temperatures of from 850°–1200° C. at the exit of the partial oxidation zone, followed by removal of the carbon oxides and water from the gaseous effluent of the partial oxidation zone. The air used for the catalytic partial oxidation is supplied in such a quantity that the molar ratio of hydrogen to nitrogen in the synthesis gas is between 2.5 and 3 to 1 and is enriched with such a quantity of oxygen that the total quantity of oxygen is sufficient to effect the required degree of hydrocarbon conversion.

9 Claims, 1 Drawing Figure

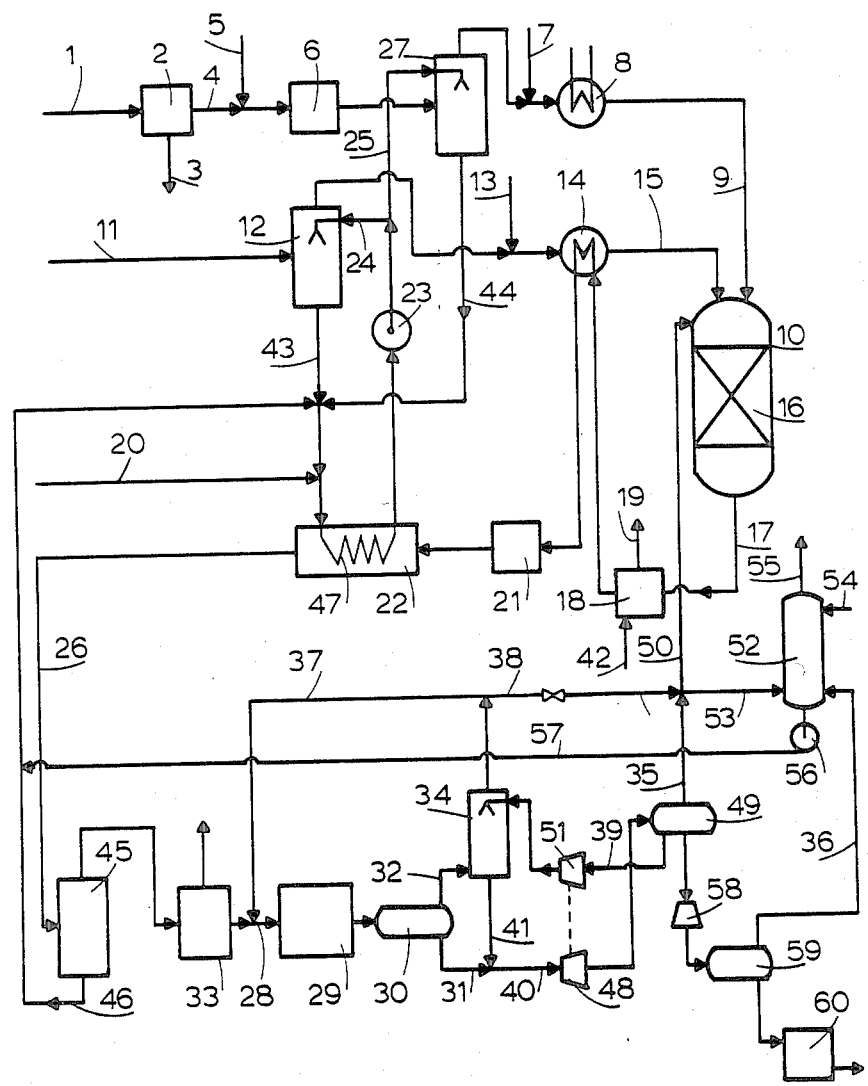

PROCESS FOR PREPARING AMMONIA

This invention relates to a process for preparing ammonia.

In current processes for the preparation of ammonia the synthesis gas is usually prepared by steam-reforming or partial oxidation of a hydrocarbon feed stock, which can be a liquid or a gaseous hydrocarbon or mixture of hydrocarbons, e.g. naphta or natural gas. A process of the type wherein the synthesis gas is obtained by partial oxidation is known from P. H. Brook: Ammonia Plant Revamping, Proceedings of the Fertilizer International Conference 1983, p. 159-175. In this process natural gas is partially oxidized with air in a Texaco gasifier and the quantity of nitrogen introduced in the process with the air, in excess of the quantity stoichiometrically required for the conversion of the hydrogen formed to ammonia, which excess may be about 200%, is removed in a cryogenic separation section. The feed gas and the process air are preheated to about 590° C. and about 815° C., respectively, in a separate furnace by combusting a suitable fuel, such as natural gas expanded to atmospheric pressure. The quantity of oxygen must be sufficient to attain the required degree of hydrocarbon conversion and the feeding thereof as air at the reaction pressure to the partial oxidation zone involves the compression and the heating of the excess introgen and other components of the air, which heating occurs by combustion of natural gas in the preheating and the partial oxidation zones. However, the compression energy and the heat required therefor can be recovered only partially. Moreover, the non catalytic partial oxidation process used necessitates a carbon removal step to remove the solid carbon formed in the partial oxidation zone and entrained in the gaseous effluent therefrom. The temperatures in the partial oxidation reactor are high so that at the exit the temperature is about 1260° C.

The principal object of the present invention is to provide a process for preparing ammonia the energy consumption of which is lower than the energy consumption of the known process referred to. More particularly the present invention is aimed at a process for preparing ammonia in which the presence of a large excess of nitrogen in the ammonia synthesis gas is obviated so that a cryogenic removal of excess nitrogen can be dispensed with. A still further particular object is to provide a process in which the heat generated in the partial oxidation zone is used in an efficient manner.

These, and other objects which will become clear from the detailed description below, are attained in a process for the preparation of ammonia from hydrogen and nitrogen comprising the steps of:

(a) feeding to a first reaction zone, at a suitable pressure, a stream of air and a stream of hydrocarbon or a mixture of hydrocarbons to form by partial oxidation a gas mixture comprising hydrogen, nitrogen, carbon oxides, water and unconverted hydrocarbon material;

(b) shift conversion of carbon monoxide contained in the gas mixture obtained in step (a) into carbon dioxide and hydrogen and removing carbon dioxide and water from the gas mixture resulting from said shift conversion, (c) feeding the synthesis gas mixture resulting from step (b) to a second reaction zone to partially convert hydrogen and nitrogen contained in said synthesis gas mixture to ammonia;

(d) separating ammonia from the gaseous effluent from said second reaction zone;

(e) recycling at least a portion of the gas mixture remaining after the separation of ammonia in step (d), in which process, according to the invention, the partial oxidation of step (a) is carried out in the presence of a suitable catalyst at a pressure of from 35 to 150 bar, and temperatures of from 850°-1200° C. at the exit of the first reaction zone, the quantity of air fed to the first reaction zone is such that the molar ratio of hydrogen to nitrogen in the gas mixture resulting from step (b) is between 2.5 and 3 to 1 and an additional quantity of oxygen is fed to the first reaction which oxygen together with the oxygen contained in the said quantity of air is sufficient to effect the required degree of hydrocarbon conversion.

The catalytic partial oxidation of hydrocarbons is known per se. It comprises passing the hydrocarbon feed material over a suitable catalyst, at a pressure between about 35 and about 150 bar and temperatures increasing toward the exit of the reaction zone between about 850° and 1200° C. In partial oxidation processes the hydrocarbons are first oxidized with a limited quantity of oxygen whereby carbon monoxide and carbon dioxide are formed and heat is released. In catalytic partial oxidation processes the heat released in this oxidation is used to catalytically convert hydrocarbons which have not yet been oxidized, in the presence of steam. Therefore in the latter processes no heat need be supplied from an external source through the wall of the reaction zone. Up till now non-catalytic partial oxidation has been used virtually exclusively for the conversion into synthesis gas of higher hydrocarbons such as fuel oil or cracked petrol and steam reforming has been considered more suitable for processing lower hydrocarbons. However, non-catalytic partial oxidation must be carried out at considerable higher temperatures between 1250° and 1400° C. and even higher. The applicant has now found that the application of catalytic partial oxidation in an ammonia synthesis starting from lower hydrocarbons e.g. those containing 1-3 carbon atoms, when carried out with air enriched with a sufficient quantity of oxygen does offer special advantages with respect to steam reforming and non-catalytic partial oxidation:

catalytic partial oxidation can be carried out at higher pressures than steam reforming and as a result less compression energy is required to compress the synthesis gas mixture to the pressure required in the ammonia synthesis. This is particularly advantageous if the starting material is natural gas already available at high pressure, because in that case no pressure reduction is necessary;

catalytic partial oxidation can be carried out at lower exit temperatures than non-catalytic partial oxidation with the result that less oxygen and feed gas are required for the conversion of the hydrocarbons;

As only so much air is supplied to the partial oxidation zone as is necessary to obtain a synthesis gas mixture containing hydrogen and nitrogen in the required ratio the amount of energy for compression of the air and the synthesis gas is substantially reduced. The total quantity of gas to be handled in the process is reduced accordingly.

carbon removal, which is necessary with non-catalytic partial oxidation, can be dispensed with;

a smaller amount of water is required than in steam reforming processes to attain the required conversion in the partial oxidation zone as the conversion takes place partly according to the reaction $$CH_4 + \tfrac{1}{2}O_2 + N_2 \rightarrow CO + 2H_2 + N_2.$$

This reaction is exotherm and releases 37 MJ/kmole $CH_4$. Hence, less steam need be supplied and less energy is required to decompose this steam. The molar steam-to-carbon ratio thus can be varied between 1.0 and 3.0. Advantageously, this ratio is selected between 1.5 and 2.5 in order to have the full profit the catalytic partial oxidation offers.

The principles of the process according to the invention will be described in more detailed with reference to the accompanying drawing which shows a schematic flow diagram of the various process steps.

Via line 1 air is supplied to an air separation unit 2 wherein a gas mixture mainly consisting of e.g. about 40% by volume oxygen and for the rest nitrogen is produced. The remainder of the air is discharged via 3 and processed for further use, if required. The proportion of oxygen in the gas mixture to be used is selected dependent fo the conditions at which the partial oxidation is effected. The mixture of oxygen and nitrogen obtained in air separation unit 2 is conveyed, via line 4, to compressor 6 together with a stream of air flowing through line 5. The quantity of air is so chosen as to result in a synthesis gas mixture having the required ratio hydrogen to nitrogen, which ratio is between 2.5 and 3 depending on the ammonia synthesis process applied. After compression to a pressure somewhat hydrocarbon higher than the selected pressure at which the partial oxidation is carried out, which pressure is between 35 and 120 bar, advantageously between 45 and 80 bar, the air enriched with oxygen is passed to a saturator 27 where it is saturated with water in a manner to be discussed later. The saturated enriched air, to which, via line 7, a further quantity of water or steam may be added, as required, is heated in one or more heaters 8 to a temperature of from 450°–900 ° C. and introduced in a first reaction zone i.e. the partial oxidation reactor 10 via line 9.

The hydrocarbon feed material is supplied via line 11. The hydrocarbon feed material which may contain 1-3 carbon atoms per mole is advantageously natural gas, but other gaseous hydrocarbons and even naphta may be used. Water is added in saturator 12. If necessary, the gaseous hydrocarbon material is compressed to somewhat above the selected reactor pressure. On the other hand, if, as is the case at a number of locations, it is available at high pressure in general reduction of the pressure is not necessary as the catalytic oxidation can be carried out at high pressures of from 35 to 150 bar. Desulphurization of hydrocarbon feed material is only necessary if the carbon dioxide produced in a subsequent carbon dioxide removal section should contain substantially no sulphur compounds and may take place prior to introduction in saturator 12 or in any other suitable part of the process. A further quantity of water or steam may be added as needed via line 13. The hydrocarbon feed steam which has substantially been saturated with water is subsequently preheated in heater 14 to a temperature which advantageously is in the range of from 450° to 750° C. The preheating of both the enriched air stream and the hydrocarbon feed stream to the indicated high temperature level results in a substantial reduction of the quantity of heat to be produced in the partial oxidation reactor 10 and consequently a smaller quanity of additonal oxygen need be supplied by the air separation unit 2 and compressed in compressor 6. The preheated hydrocarbon feed stream enters, via 15, the partial oxidation reactor 10 in which a first part of it is combusted, with the aid of the enriched air, to carbon monoxide, carbon dioxide and water and this mixture is next passed through a catalyst bed 16 comprising a suitable catalyst such as, e.g. a nickel-containing catalyst, in which most of the hydrocarbons still present are converted to carbon monoxide, carbon dioxide and hydrogen.

Thus an effluent gas mixture is obtained comprising hydrogen, nitrogen, carbon oxides, water vapour, inert gases, such as argon and helium, and unconverted hydrocarbons. The temperature of this effluent gas mixture is between 850° and 1200° C. depending on the process conditions, starting material used etc. and at a reactor pressure of about 55 bar will between 900° and 1050° C.

In the embodiment shown the effluent gas mixture is first passed through a waste heat boiler 18 via line 17 to generate steam from water supplied through line 42, the steam being carried off via 19, and then through preheater 14 to preheat the hydrocarbon feed material to a temperature of e.g. about 650° C. Optionally the waste heat boiler 18 may be omitted and a larger proportion of the heat content of the effluent gas mixture may be used to preheat the hydrocarbon feed stream to a higher temperature of say 700° to 750° C.

The partially cooled effluent gas mixture leaving preheater 14 is passed to a shift conversion section 21 which normally comprises a high temperature stage and an low temperature stage, well known in the art, wherein the carbon monoxide is catalytically converted with steam to carbon dioxide. If in the partial oxidation step a comparatively low steam to carbon ratio is maintained the steam content in the gas mixture will be accordingly low, but it will be understood that by proper selection of the catalysts for both stages a satisfactory degree of conversion can still be obtained.

The raw synthesis gas mixture leaving shift conversion section 21 is further cooled in cooling unit 22 to condense most of the water it contains. This condensation takes place at a temperature level enabling the heating of a stream of process condensate and/or water supplied via lines 20 and 46 to the heat exchange elements 47 and the evaporation thereof in the saturators 12 and 27 to which it is supplied via pump 23 and lines 24 and 25, respectively. In this way the heat released by cooling and condensation is used in an efficient manner by taking advantage of the relatively low partial water vapour pressures in the hydrocarbon feed stream and the enriched air stream which require only low evaporation temperatures. The water which is not evaporated in the saturators 12 and 27 is recycled via lines 43 and 44 to cooling unit 22 for reheating.

The raw synthesis gas mixture depleted of most of the water is further treated in a known way in section 45 to remove substantially all the water remained in it, the process condensate formed thereby is recycled to cooling unit 22 via line 46 for reuse in the saturation of the hydrocarbon feed stream and the enriched air and the remaining gas mixture is passed to a carbon dioxide removal section and a methanation section commonly represented by 33 in which carbon dioxide is removed from the synthesis gas mixture, e.g. by selective absorption, and subsequently the carbon monoxide and carbon dioxide are converted to methane. The synthesis gas leaves section 33 at a pressure suitable for the ammonia synthesis which pressure may vary between 60 and 300 bar depending on the ammonia synthesis process selected. It will be understood that by proper selection of the pressure at which the synthesis gas is prepared and the pressure at which the ammonia synthesis is operated compression of the synthesis gas can be minimized or entirely dispensed with, which results in a substantial saving in energy consumption.

Via line 28 the synthesis gas mixture is introduced in a second reaction zone i.e. ammonia synthesis reactor 29, together with a stream of unconverted gases which is recycled via line 37. The ammonia synthesis effluent stream is passed to ammonia separation section 30 in which the ammonia is recovered by refrigeration. The liquid ammonia thus obtained is passed to a pressure reduction device 48 via lines 31 and 40. In this pressure reduction device, which in the embodiment shown is an expansion turbine the pressure is reduced to a pressure somewhat higher than that at which the partial oxidation reactor is operatued, for a reason which will be explained below. The expanded ammonia synthesis effluent stream flows into a flas tank 49 in which the unconverted gases containing some ammonia are flashed off. The unconverted gases leaving ammonia separation section 30 which contain the gaseous hydrocarbons slipped through the partial oxidation reactor without having been converted and the methane formed in the methanation step are passed to an absorption column 34 or a similar device via line 32 wherein they are contacted with liquid ammonia which is taken from flash tank 40 via line 39 and repressurized to the ammonia synthesis pressure by pump 51. In this treatment use is made of the fact that methane and argon are more easily dissolved in liquid ammonia than hydrogen and nitrogen, and as a result a substantial portion of the methane and argon is removed from the recycled gas mixture. This way of recovering non-converted gaseous hydrocarbons allows a more flexible operation of the partial oxidation reactor since the quantity of gaseous hydrocarbon slipping through non-converted is no longer critical. A large portion of the recycled gas mixture is reintroduced in the ammonia synthesis reactor 29 via line 37, another portion, advantageously 2 to 10% by volume, is recycled to the partial oxidation reactor 10 via lines 38 and 50 and a small remaining portion may be sent to a gas scrubber 52 via line 53 for recovery of the ammonia by absorption in water supplied via 54 and subsequently be used as boiler fuel etc. or directly be purged from the process via 55. The aqueous ammonia solution discharged from scrubber 52 may be combined witht the process condensate stream 46 discharged from section 45 via pump 56 and line 57. It should be noted that the purge gas stream may be split off from another gas stream, such as e.g. the gas stream coming from ammonia separation section 30. Also, it is not necessary to treat the entire gas mixture in absorption column 34, a portion may be recycled directly to the ammonia synthesis reactor 30 depending on the inert content of the feed to this reactor.

The liquid ammonia containing the unconverted gaseous hydrocarbons and inert gases absorbed in absorption column 34 is combined, via line 41, with the liquid ammonia stream leaving ammonia separation section 30 and the combined stream is passed via line 40, to expansion rubine 48. The gases mainly consisting of unconverted gaseous hydrocarbons separated off in flash tank 49 are recycled to the partial oxidation reactor 10 via lines 35 and 50. A portion thereof may be purged via purge gas scrubber 52, if required. The liquid ammonia obtained in flash tank 49 is partly pumped to absorption column 34 which is operated at about ammonia synthesis pressure, by pump 51 which may be driven by expansion turbine 48, the remaining portion being passed to storage tank 60 after the pressure has been suitably reduced in a pressure reduction device 58, such as an expansion turbine, and the gases released thereby, which still contain some gaseous hydrocarbons, have been separated off in flash tank 59. These gases are passed to purge gas scrubber 52 via line 36.

In the embodiment shown the pressure of the liquid ammonia discharged from ammonia separation section 30 is reduced in two steps so that a substantial proportion of the recovered gaseous hydrocarbons can be recycled to partial oxidation reactor 10 without compression in a separate compression device. It is also possible, however, to reduce the pressure in a single step to the pressure at which the ammonia is stored and to recompress the released gases to the required pressure or to use them as burner fuel etc.

EXAMPLE

In a plant for the production of ammonia with the process according to the invention the starting material was natural gas which was preheated to 650° C. and air enriched with oxygen was preheated to 800° C. In the catalytic partial oxidation reactor a molar steam-to-carbon ratio of 2 and a pressure of 55 bar were maintained. The temperature at the exit of the reactor was 1050° C. Besides the steam generated in the saturators and the waste heat boiler an additional quantity of steam required on the process was raised in a separate boiler using natural gas and process purge gas as fuel. The ammonia synthesis pressure was 200 bar.

The composition of the principal process streams for the production of 1 ton ammonia is given in the table below. The numbers of the streams correspond with the reference numbers in the drawing. The quantities are in kg.

| name | natural gas process feed | natural gas boiler fuel | enriched air feed | recycle gas to POR* | POR* effluent | Purge to boiler | Product |
|---|---|---|---|---|---|---|---|
| no. of stream | 11 | | 4 + 5 | 50 | 17 | 55 | 60 |
| $O_2$ | | | 608 | | | | |
| $N_2$ | 25 | 2 | 806 | 28 | 860 | 8 | |
| $H_2$ | | | | 6 | 144 | 2 | |
| CO | | | | | 641 | | |
| $CO_2$ | 22 | 2 | | | 471 | | |
| $CH_4$ | 448 | 35 | | 13 | 8 | 5 | |
| $C_2H_6$ | 72 | 6 | | | | | |
| Ar | | | 20 | 16 | 36 | 4 | |
| $NH_3$ | | | | | 1 | | 1000 |

| name | natural gas process feed | natural gas boiler fuel | enriched air feed | recycle gas to POR* | POR* effluent | Purge to boiler | Product |
|---|---|---|---|---|---|---|---|
| H₂O | | | | | 1071 | | |
| Total | 576 | 45 | 1434 | 64 | 3230 | 19 | 1000 |

*partial oxidation reactor

Based on the lower heating value the total quantity of natural gas of 576+45=612 kg/ton ammonia corresponds with 28 GJ of energy per ton ammonia.

COMPARATIVE EXAMPLE

In the process described in the article by Brook referred to above the nitrogen is about 200% in excess to the quantity that is stoichiometrically required in the ammonia synthesis.

| | |
|---|---|
| In a process in which the partial oxidation is carried out at 70 bar the energy consumption for compression of this excess nitrogen is | 1.1 GJ/ton NH₃ |
| In the cryogenic nitrogen removal section the nitrogen is obtained at 10 bar. In an expansion turbine this nitrogen can produce | 0.4 GJ/ton NH₃ |
| Hence the mechanical energy to be supplied is | 0.7 GJ/ton NH₃ |
| In the process according to the invention comprising catalytic partial oxidation with air enriched with oxygen the production of the additional oxygen requires in mechanical energy | 0.35 GJ/ton NH₃ |

This results in an advantage in mechanical energy of the process according to the invention over the known process of 0.35 GJ/ton NH₃. This corresponds with an advantage in natural gas consumption of about 1 GJ/ton NH₃.

I claim:

1. Process for the preparation of ammonia from hydrogen and nitrogen comprising the steps of:
    (a) feeding to a first reaction zone, at a suitable pressure, a stream of air and a stream of hydrocarbon or a mixture of hydrocarbons to form by partial oxidation a gas mixture comprising hydrogen, nitrogen, carbon oxides, water and unconverted hydrocarbon material;
    (b) shift conversion of carbon monoxide contained in the gas mixture obtained in step (a) into carbon dioxide and hydrogen and removing carbon dioxide and water from the gas mixture resulting from said shift conversion;
    (c) feeding the synthesis gas mixture resulting from step (b) to a second reaction zone to partially convert hydrogen and nitrogen contained in said synthesis gas mixture to ammonia;
    (d) separating ammonia from the gaseous effluent from said second reaction zone;
    (e) recycling at least a portion of the gas mixture remaining after the separation of ammonia in step (d);
    characterized in that
    the partial oxidation of step (a) is carried out in the presence of a suitable catalyst at a pressure of from 35 to 150 bar, and temperatures of from 850°–1200° C. at the exit of the first reaction zone,
    an additional quantity of oxygen is fed to the first reaction zone,
    controlling the quantities of air and additional oxygen with respect to the quantity of hydrocarbon material fed to the first reaction zone in such a manner that the molar ratio of hydrogen to nitrogen in the gas mixture resulting from step (b) is between 2.5 and 3 to 1.

2. Process according to claim 1, characterized in that in the first reaction zone a molar ratio steam to carbon of from 1.0 to 3 is maintained.

3. Process according to claim 1, characterized in that in the first reaction zone a molar ratio steam to carbon of from 1.5 to 2.5 is maintained.

4. Process according to claim 1, characterized in that the catalytic partial oxidation in the first reaction zone is carried out at a pressure of from 45 to 80 bar and temperatures of from 900° to 1100° C. at the exit of the first reaction zone.

5. Process according to claim 1, characterized in that the gas mixture obtained in step (b) is cooled to condense at least part of the water vapour contained therein, the heat released thereby is used to evaporate water and the water vapour thus obtained is fed to the first reaction zone.

6. Process according to claim 5, characterized in that the water to be fed to the first reaction zone is evaporated in at least one of the feed streams to the first reaction zone.

7. Process according to claim 1 characterized in that in step (e) the portion of the gas mixture to be recycled is at least partially treated to remove hydrocarbon material and inert gases therefrom and the thus removed hydrocarbon material is at least partially recycled to the first reaction zone.

8. Process according to claim 1, characterized in that hydrocarbon material and inert gases are removed from at least part of the portion of the gas mixture to be recycled to the second reaction zone by absorption in liquid ammonia and are separated from the resulting absorbate.

9. Process according to claim 8, characterized in that part of the hydrocarbon material and inert gases are removed from the absorbate by reducing the pressure thereof to substantially the pressure maintained in the first reaction zone and at least part of the thus removed gaseous mixture is recycled to said first reaction zone.

* * * * *